UNITED STATES PATENT OFFICE.

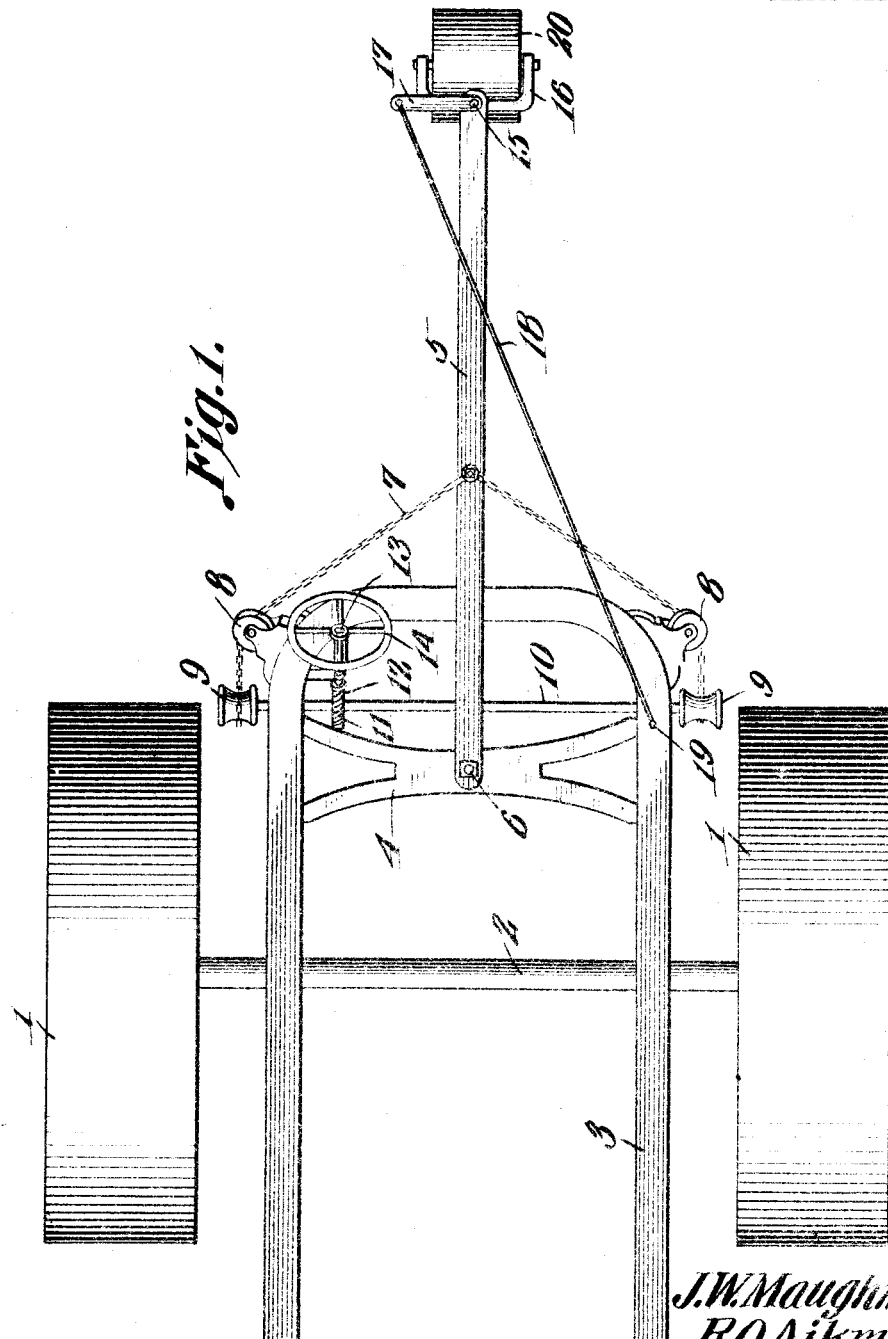

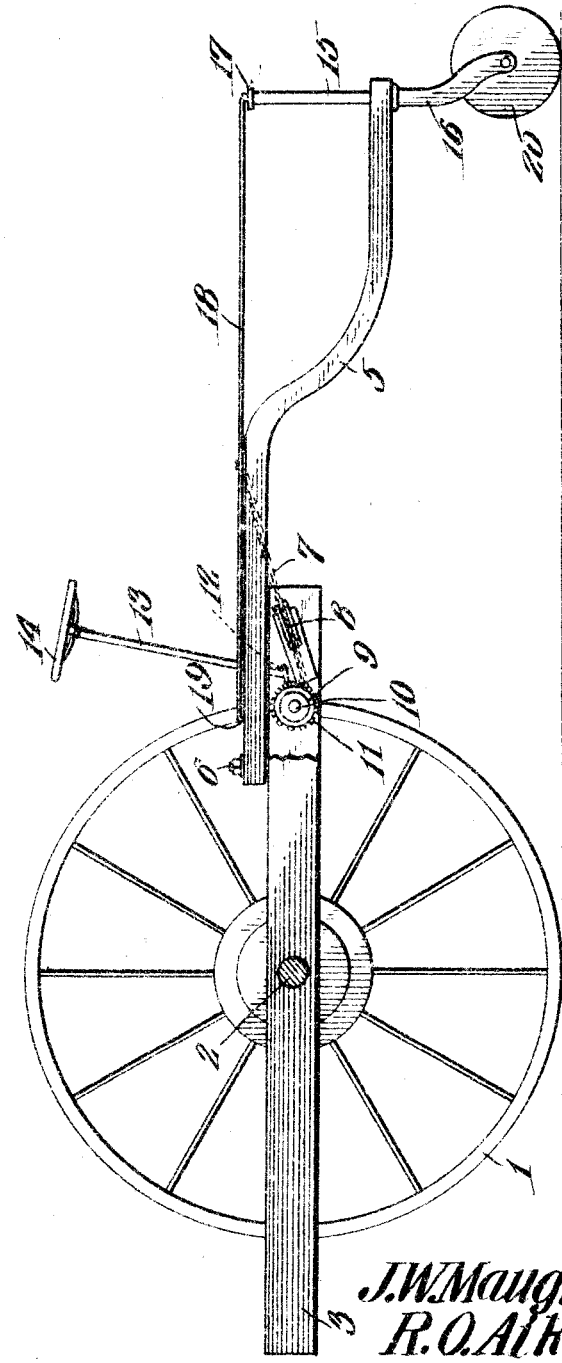

JOHN W. MAUGHMER AND RALPH O. AIKMAN, OF HUME, ILLINOIS.

TRACTOR.

1,068,517.  Specification of Letters Patent.  Patented July 29, 1913.

Application filed November 4, 1912. Serial No. 729,532.

*To all whom it may concern:*

Be it known that we, JOHN W. MAUGHMER and RALPH O. AIKMAN, citizens of the United States, residing at Hume, in the county of Edgar, State of Illinois, have invented a new and useful Tractor, of which the following is a specification.

This invention relates to tractors for use more particularly in propelling agricultural machines, the invention being primarily an improvement in the steering mechanism of the tractor.

One of the objects of the invention is to provide steering means whereby an abrupt turn of the tractor may be effected, said means being easily operated and being simple in construction and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the tractor, the motor and the mechanism propelled thereby being removed. Fig. 2 is a side elevation of the parts shown in Fig. 1.

Referring to the figures by characters of reference 1 designates the drive wheels of the tractor, the same being connected by an axle 2 which is driven by any suitable mechanism not shown. Mounted on this axle is a frame 3 preferably of the form shown and in which is secured a cross bar or spider 4 having a rearwardly extending beam 5 pivotally connected to the center thereof, as shown at 6. This beam has steering chains 7 or other flexible elements secured thereto at a point between its ends and extending from opposite sides thereof, these flexible elements being brought into engagement with guide sheaves 8 mounted upon the rear corner portions of the frame 3. From these sheaves the flexible elements 7 extend to spools 9 which are secured to a transverse shaft 10 carried by the frame 3. A worm wheel 11 is mounted on this shaft and is engaged by a worm 12 formed upon or secured to an upwardly extending steering shaft 13, this shaft being provided with a hand wheel 14 or the like whereby it can be readily rotated by the operator. It is to be understood that the flexible elements 7 are so connected to the spools 9 that when one of them is being wound upon one spool, the other connection 7 is being unwound. Thus it will be seen that the beam 5 can be swung toward the right or left as desired.

The rear end of the beam 5 is adapted to be connected to a supporting element such as a wheeled plow, a mowing machine, a cultivator, or, as in the present instance, a steering wheel. In the structure shown, a stem 15 is mounted for rotation within the rear end of the beam 5 and has a fork 16 at its lower end while its upper end is provided with a laterally extending arm 17. Pivotally connected to the free end of this arm is a rod 18 which extends diagonally across the beam 5 and is pivotally attached, at its front end, to one side of the frame 3, as shown at 19. A wheel 20 is journaled within the fork 16 although it is to be understood that any other suitable soil engaging element such as a plow structure, a cultivator or the like, may be secured within this fork.

It will be apparent that when the beam 5 is extended straight rearwardly from the frame 3, the machine will move straight forward. When, however, it is desired to turn the machine, shaft 10 is rotated in one direction so as to cause one of the flexible elements 7 to be wound upon its spool and the other element 7 to be unwound. Thus beam 5 will be swung to the right or to the left as desired and, by reason of the connection between arm 17 and frame 3, the fork 16 will not only be swung toward one side of the machine but will, at the same time, be swung about the longitudinal axis of the stem 15. Thus the entire machine can make a more abrupt turn than would be possible should the axis of the wheel 20 be disposed at all times at right angles to the longitudinal center of the beam 5.

What is claimed is:—

1. In a tractor the combination with a wheel supported frame, of a beam extending rearwardly therefrom, a stem extending upwardly through the rear end portion of the beam and mounted for rotation, a soil engaging element connected to the stem, a member extending laterally from the stem, an obliquely disposed connection between said member and one side of the frame, said connection extending across the beam, and means for swinging the beam horizontally to move it relative to the connection and rotate the stem.

2. In a tractor the combination with a wheel supported frame and a beam mounted to swing horizontally relative thereto, said beam being connected to the frame, of a transverse shaft, spools thereon, flexible elements connected to the spools and to the beam, said elements being extended beyond opposite sides of the beam respectively, means for rotating the shaft to simultaneously wind one of the elements and unwind the other element, a soil engaging element adapted to rotate about an axis extending upwardly through the rear end portion of the beam, said element being movable with the beam, a member movable with said soil engaging element, and a non-flexible connection between one side portion of the frame and a point upon said member remote from the axis of rotation thereof, said connection being extended obliquely across the beam.

In testimony that we claim the foregoing as our own, we have hereto affixed our signatures in the presence of two witnesses.

JOHN W. MAUGHMER.
RALPH O. AIKMAN.

Witnesses:
O. O. WILLIAMS,
GEO. W. HUGHES.